(12) United States Patent
Chiappetti et al.

(10) Patent No.: US 7,613,632 B2
(45) Date of Patent: Nov. 3, 2009

(54) SYSTEM AND METHOD FOR PERFORMING AUTOMATED TESTING OF A MERCHANT MESSAGE

(75) Inventors: Steve T. Chiappetti, Glendale, AZ (US); John R. Nelson, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 385 days.

(21) Appl. No.: 11/273,002

(22) Filed: Nov. 14, 2005

(65) Prior Publication Data

US 2007/0124210 A1 May 31, 2007

(51) Int. Cl.
*G06G 1/12* (2006.01)
*G06F 17/60* (2006.01)

(52) U.S. Cl. .......................................... 705/21; 705/39
(58) Field of Classification Search .................... 705/21, 705/39, 35
See application file for complete search history.

(56) References Cited

U.S. PATENT DOCUMENTS

| | | | | |
|---|---|---|---|---|
| 4,622,550 | A * | 11/1986 | O'Connor et al. | 370/452 |
| 4,719,625 | A * | 1/1988 | Bell et al. | 714/4 |
| 5,481,532 | A * | 1/1996 | Hassan et al. | 370/312 |
| 5,481,539 | A * | 1/1996 | Hershey et al. | 370/312 |
| 5,576,955 | A * | 11/1996 | Newbold et al. | 715/217 |
| 6,135,349 | A | 10/2000 | Zirkel | 235/375 |
| 6,430,704 | B1 | 8/2002 | Goodwin, III et al. | 714/25 |
| 6,577,755 | B1 * | 6/2003 | Lorie | 382/140 |
| 6,752,313 | B1 | 6/2004 | Caviles et al. | 235/375 |
| 2002/0032648 | A1 | 3/2002 | Pine et al. | 705/39 |
| 2002/0120559 | A1 | 8/2002 | O'Mara et al. | 705/38 |
| 2002/0138771 | A1 | 9/2002 | Dutta | 713/202 |
| 2002/0194121 | A1 * | 12/2002 | Takayama | 705/39 |
| 2003/0061163 | A1 | 3/2003 | Durfield | 705/44 |
| 2003/0187778 | A1 | 10/2003 | Sgaraglio et al. | 705/38 |
| 2003/0187782 | A1 * | 10/2003 | Sgaraglio et al. | 705/39 |
| 2004/0054625 | A1 | 3/2004 | Kellogg et al. | 705/41 |
| 2004/0111343 | A1 | 6/2004 | Lindvall et al. | 705/35 |
| 2004/0112954 | A1 | 6/2004 | Moreau, Jr. et al. | 235/380 |
| 2004/0128583 | A1 | 7/2004 | Iulo et al. | 714/25 |
| 2004/0153399 | A1 | 8/2004 | Wilkes | 705/39 |
| 2004/0215543 | A1 | 10/2004 | Betz et al. | 705/35 |
| 2005/0075977 | A1 | 4/2005 | Carroll et al. | 705/40 |
| 2005/0081108 | A1 | 4/2005 | Shabalin | 714/38 |
| 2005/0091114 | A1 | 4/2005 | Philips et al. | 705/15 |
| 2005/0156810 | A1 * | 7/2005 | Zerphy et al. | 345/1.1 |

OTHER PUBLICATIONS

"Product Fact Sheet Authentic EFT Transaction Authorization, Switching and Payment Fraud Prevention,"Alaric Systems Ltd., 2003.
"Lexcel TestSystem® POS," Lexcel Solutions, Inc., http://www.lexcel.com/pos_testing.html, printed Jul. 26, 2005.
"Solutions for Financial Institutions: POS," Lexcel Solutions, Inc., http://www.lexcel.com/solution_FI_POS.html, printed Jul. 26, 2005.

* cited by examiner

*Primary Examiner*—Matthew S Gart
*Assistant Examiner*—Garcia Ade
(74) *Attorney, Agent, or Firm*—Fitzpatrick, Cella, Harper & Scinto

(57) ABSTRACT

Error-testing of merchant messages to be used with point-of-sale (POS) devices is performed by an automated system that receives a formatted message to be tested from a merchant or an agent of the merchant, performs a computer-implemented evaluation of the message according to predefined message-validation rules to detect one or more errors, and notifies the merchant or the agent of evaluation results. The evaluation results include a listing of each detected error, if any.

14 Claims, 5 Drawing Sheets

SYSTEM AND METHOD FOR PERFORMING AUTOMATED TESTING OF A MERCHANT MESSAGE

BACKGROUND OF THE INVENTION

1. Field of the Invention

The present invention generally relates to a system and a method for performing testing of merchant messages and, more particularly, to a system and a method for enabling a merchant to test, in real time, messages to be used with a point-of-sale device.

2. Related Art

Consumers very often use financial transaction instruments as convenient forms of payment for purchases of goods and/or services ("goods/services"). A "financial transaction instrument," also referred to herein as a "card," may be any of the following: a traditional "plastic" transaction card (e.g., a credit card, a charge card, a debit card, a pre-paid or stored-value card, or the like); a titanium-containing, or other metal-containing, transaction card; a clear or translucent transaction card; a foldable or otherwise unconventionally-sized transaction card; a radio-frequency-enabled transaction card; or any other type of card used in connection with a financial transaction.

A financial transaction instrument may be configured with electronic functionality. For example, such an instrument can have electronic circuitry that is printed or otherwise incorporated onto or within it (commonly being referred to as a "smart card"), or may be a fob-type device having a transponder and a radio-frequency identification ("RFID") reader. Additionally, a financial transaction instrument may be magnetically encoded with information, such as through use of a magnetic stripe, for example. Optionally, a financial transaction instrument may include a visible card identification number ("CID") uniquely identifying a corresponding transaction account, in case the transaction instrument cannot easily be read electronically or magnetically.

A "transaction account," as used herein, refers to an account associated with an open-account system or a closed-account system, which are discussed in more detail below. A transaction account may exist in a physical or a non-physical embodiment. For example, a transaction account may be distributed in a non-physical embodiment such as an account number, a frequent-flyer account, a telephone calling account, or the like. Furthermore, a physical embodiment of a transaction account may be distributed as a financial transaction instrument.

"Open cards" are financial transaction instruments associated with an open-account system and generally are accepted by different merchants. Examples of open cards include the American Express®, Visa®, MasterCard® and Discover® cards, which may be used at many different retailers and other businesses. In contrast, "closed cards" are financial transaction instruments associated with a closed-account system and may be restricted to use in a particular store, a particular chain of stores, or a collection of affiliated stores. One example of a closed card is a pre-paid gift card for The Gap®, which typically is purchased at and may only be accepted at The Gap® stores.

Generally, a merchant that wants to provide customers with the option to pay for goods/services with a particular type of open card will enter into an agreement with the issuer of that type of card (e.g., American Express®, Visa®, Discover®, MasterCard®, or the like). The issuer typically is a financial organization (e.g., American Express®, JPMorgan Chase, MBNA®, Citibank®, or the like) whose card-issuing activities are government regulated.

Because of the wide use of cards by consumers, the types and number of merchants that accept cards have grown and now include, in addition to the more traditional merchants such as stores and restaurants, taxi drivers, doctors, schools, street vendors, on-line vendors, and government agencies. Through the use of cards, merchants are able to obtain prompt payment for the purchased goods/services.

Issuers have a financial incentive to contract with as many merchants as possible to accept their cards. Typically, an issuer is paid a so-called "discount rate" by each merchant signed up to accept payment using the issuer's type of card. The discount rate may be, for example, a flat rate paid periodically or a rate based on the merchant's net sales that are paid for using the issuer's type of card.

In order to convince merchants to accept its card, an issuer may provide the merchants with assistance with the set-up process, at no cost to the merchants. The set-up process may include: providing the merchants with point-of-sale ("POS") devices, including hardware and software for reading cards; providing training to employees of the merchants as to how to use the POS devices; providing communication equipment and establishing communication procedures for obtaining quick payment authorizations; and troubleshooting services.

A POS device may be any electronic device used by a merchant to input information regarding a purchase as well as other information, such as information regarding the merchant, information for identifying a financial transaction account from which payment for the purchase is to be obtained, etc. For example, the input information may include a dollar amount of the purchase and identification information electronically and/or magnetically read from a card used to make the purchase. Optionally, the identification information may be manually input at the POS device based on a visible CID. The purchase information and the identification information are transmitted to the issuer's computer system, which identifies the financial transaction account and makes a determination of whether the purchase is approved or rejected based on account information regarding the financial transaction account. The issuer's computer system then transmits a message back to the POS device regarding the purchase. Examples of messages sent between the POS device and the issuer's computer system include: a request for authorization, an authorization approval or rejection; an instruction to obtain additional identification to verify the identity of the person presenting the card; a message indicating that the financial transaction account has reached a maximum aggregate dollar amount; etc.

The process of configuring POS devices entails significant costs for the issuers, a large portion of which are the labor costs for the personnel involved in the various aspects of the set-up process. For example, in order for an issuer to perform certification testing, in which merchants submit messages to be used with POS devices for testing and certification by the issuer, involvement by at least six sub-groups of the issuer is necessary, with a typical man-hour usage of 70-75 hours or more per certification test. Certification testing costs can be upwards of $1 million per year for issuers with large numbers of subscribing merchants.

Conventionally, each message submitted for testing is evaluated manually. Thus, the issuer is required to have a trained staff of testing personnel that evaluate messages as they come in. If more messages are submitted for testing than can be handled by the testing personnel, there is a delay in providing test results to the merchants. This delay leads to a delay in when the messages can be certified for use in the merchants' POS devices, which not only can cause merchant dissatisfaction with the issuer but also can cause the issuer to lose revenue from the purchases that would have been paid for using the issuer's type of card had those POS devices been set up to work with the messages sooner. On the other hand, if the issuer overstaffs and employs more testing personnel than necessary to evaluate the submitted messages, the issuer must bear the payroll costs of the underutilized staff. Further, manual testing cannot completely eliminate the possibility of human testing errors, which can significantly slow down the process of getting messages certified for use.

Given the foregoing, what is needed is a system, a method, and a computer program product for facilitating testing of merchant messages using a computer-based global authorization network.

BRIEF DESCRIPTION OF THE INVENTION

The present invention meets the above-identified needs by providing a system, a method, and a computer program product for automated testing of merchant messages to be used with POS devices.

An advantage of the present invention is that it allows a merchant to quickly determine whether a new message or a revised message, which is to be used with a POS device for purchases made using a financial transaction instrument, is usable with a computer system set up by the issuer of the financial transaction instrument to process messages. Messages may be submitted for testing at any time (i.e., 7 days per week and 24 hours per day), testing is automatically performed upon receipt of the messages, and merchants are notified of test results as soon as testing is completed. That is, the present invention enables real-time evaluation of merchant messages, so that any messages deemed unacceptable may quickly be corrected and resubmitted for testing. This significantly reduces the set-up time necessary to bring a merchant "on-line" (i.e., ready to accept payments made using the issuer's card).

Another advantage of the present invention is that it reduces the set-up costs required to bring a merchant on-line. As mentioned above, a large part of these costs is the labor costs for the various personnel required to perform testing of merchant messages according to conventional practice. The present invention streamlines how messages are tested and eliminates a significant part of the set-up costs.

According to the present invention, a system, a method, and a computer program product is provided for performing computer-implemented error testing on a merchant message to be used in connection with a transaction involving a financial transaction instrument. A testing computer receives the message to be tested from a merchant or an agent of the merchant via a communication network. The testing computer performs an evaluation of the message according to predefined message-validation rules, which detect one or more errors in the message. When the evaluation has completed, the testing computer sends a notification of the testing results to the merchant or to the agent.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when considered in conjunction with the attached drawings, in which like reference numbers indicate identical or functionally similar elements. Additionally, the left-most digit of a reference number identifies the drawing in which the reference number first appears.

DETAILED DESCRIPTION OF THE INVENTION

I. Overview

The present invention is directed to a system, a method, and a computer program product for performing certification testing of merchant messages to be used with POS devices. Automated testing is performed in real time upon submission of a message by a merchant, and test results are provided to the merchant through an electronic message and/or through another notification procedure specified by the merchant. Because the testing is automated, messages may be submitted on a 7-days-per-week and 24-hours-per-day basis, with prompt notification of test results to the merchant.

A message to be tested may be submitted by a merchant or by a third-party agent (TPA) acting on behalf of the merchant. For simplicity, the present invention is described in terms of the merchant as the party submitting the test message. It is to be understood that, instead of the merchant, the TPA may submit the message for testing.

As used herein, the term "merchant" refers to any person, entity, distributor system, software, and/or hardware that is a provider or broker of goods/services, and includes any other entity in the distribution chain of goods/services. For example, a merchant may be a grocery store, a retail store, a travel agency, a service provider, a public-service utility, a school, a library, an on-line merchant, a government agency, or the like.

II. System

Figure 1:
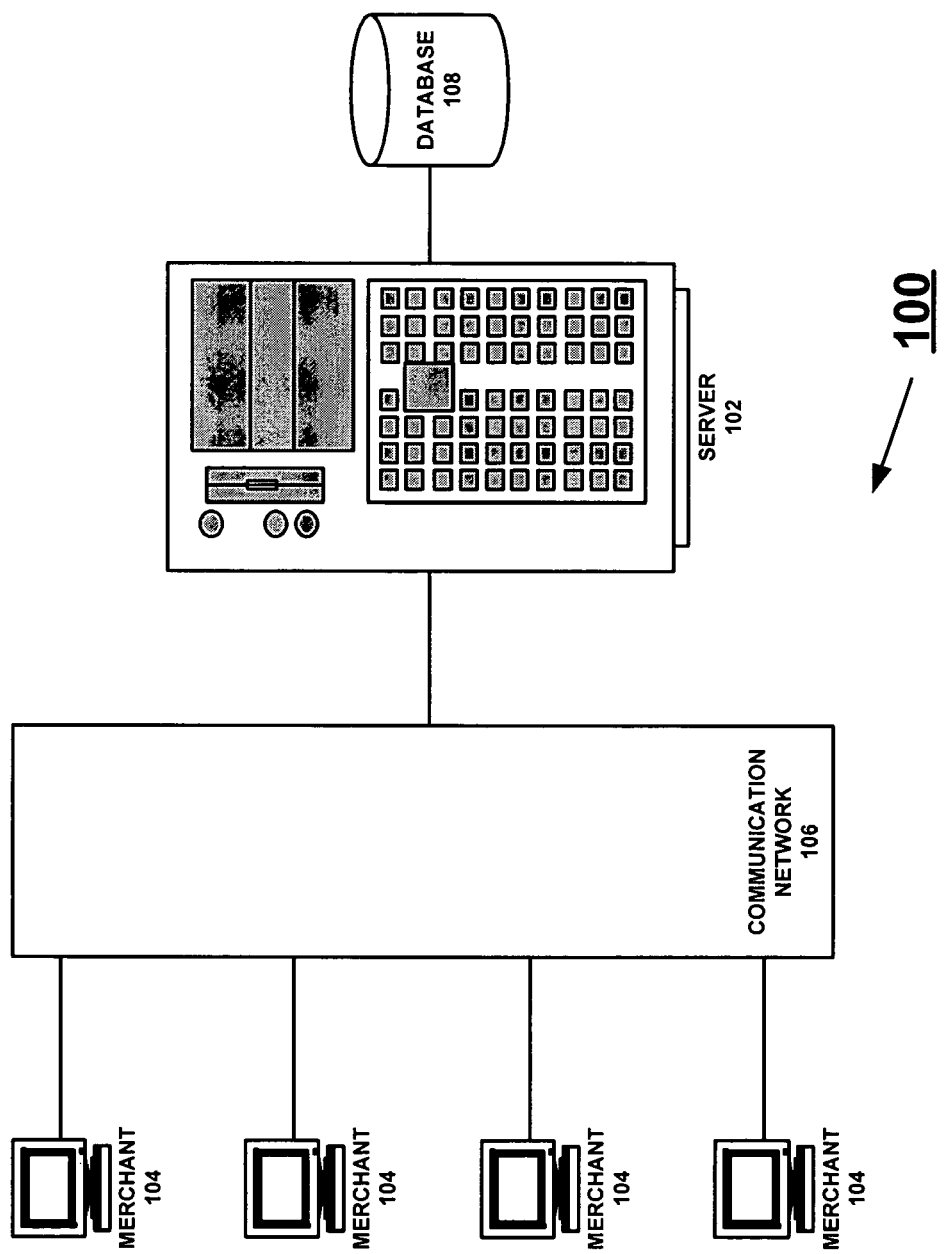
FIG. 1 schematically illustrates a system diagram of an exemplary Global Authorization Network system, according to an embodiment of the present invention.

FIG. 1 shows a schematic system diagram of an exemplary Global Authorization Network (GAN) system 100, used to implement or practice one or more embodiments of the present invention. GAN system 100 includes a server 102 interconnected with one or more merchant computing systems 104 via a communication network 106. A database 108 is accessible by server 102 to store information therein or retrieve information therefrom. Communication network 106 may be the Internet, a public switched telephone network (PSTN) with one or more dedicated leased lines, or any other means of communication between server 102 and merchant computer system(s) 104, whether wired or wireless. Merchant computing system 104 may be any of: a personal computer, a workstation, a mainframe computer, a personal digital assistant, or any other digital device able to perform data communication with server 102. In one embodiment, merchant computing system 104 and the merchant's POS device may be integrated into a single system.

Databases discussed herein may be of any type, such as relational, hierarchical, graphical, object-oriented, or other database configurations. This includes, but is not limited to, support of well known databases such as Microsoft® Access, MySQL®, Microsoft® SQL, Foxpro®, Lotus Notes®, Excel®, Oracle®, DB2®, and the like. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art.

Optionally, to ensure security, communications may occur indirectly with server 102 through a security filter such as, for example, a firewall, which may be implemented with hardware, software, or a combination thereof. According to another option, to ensure security, communications may occur directly with server 102 after an authentication process verifies that a computing system and/or a user of the computing system attempting to communicate with server 102 are/is authorized to do so. For example, a single sign-on ("SSO") security procedure may be implemented prior to allowing direct communication with server 102. Other types of security measures may be employed, as will be appreciated by persons of skill in the relevant art(s).

Figure 2:
FIG. 2 shows an example of a portion of an alphanumeric string of a message submitted for testing, according to an embodiment of the present invention.

FIG. 2 illustrates an example of a portion of a message 200 submitted for testing. Message 200 is sent from merchant computing system 104 as an alphanumeric string 202 formatted according to well-known data-communication standards. Preferably, message 200 is formatted according to International Organization for Standardization standards, such as the ISO-8583 standard, for example. Alphanumeric string 202 includes data for a plurality of information fields pertaining to the merchant and to a "dummy" or simulated transaction created to test message 200.

Figure 3:
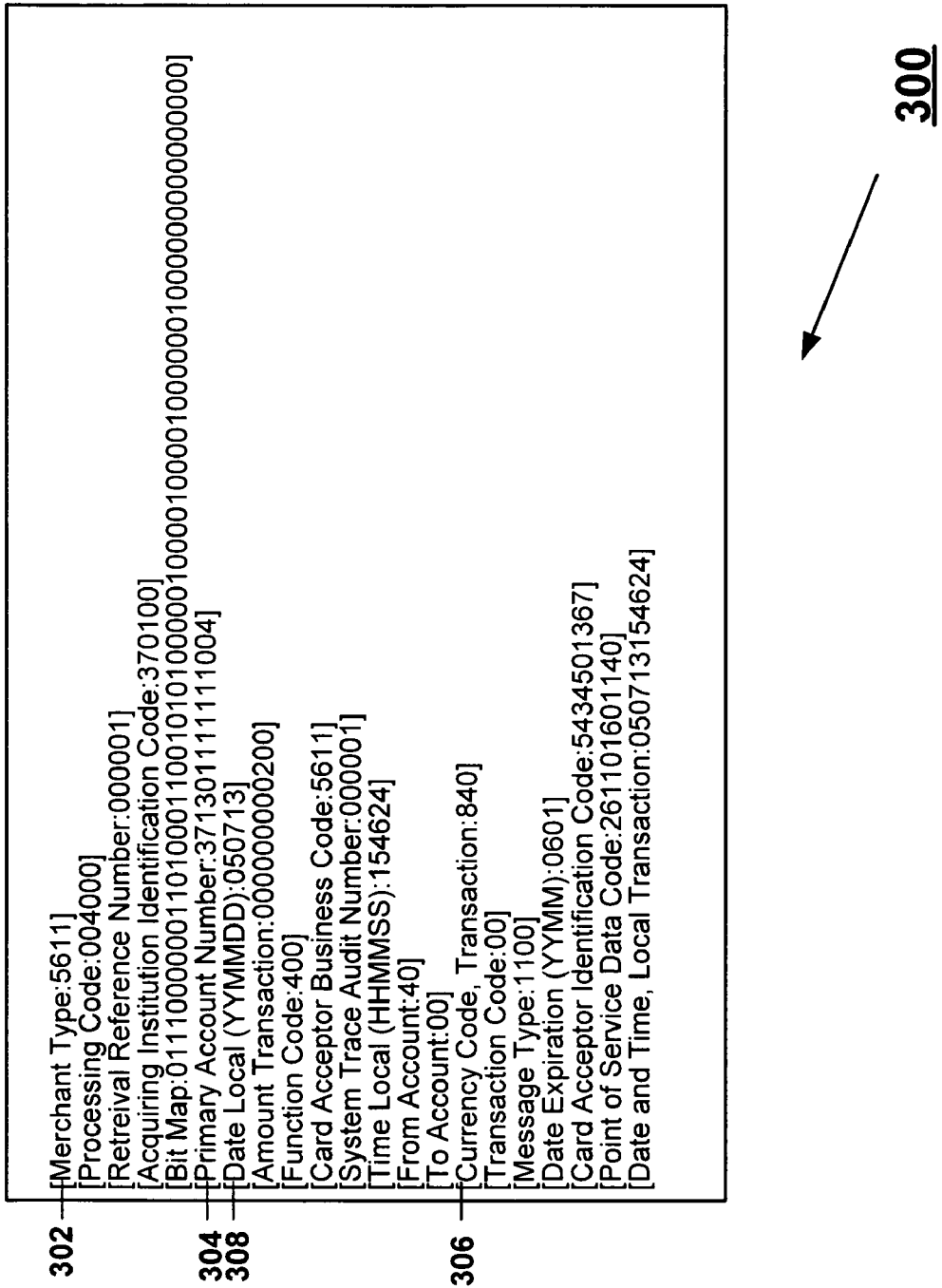
FIG. 3 shows an example of various information fields represented in a message submitted for testing, according to an embodiment of the present invention.

FIG. 3 shows an example of an "interpreted" message 300 determined or obtained from the alphanumeric string 202 of message 200. That is, characters included in alphanumeric string 202 are interpreted or parsed to discern a plurality of fields of information, which are presented in the rows of interpreted message 300. As shown in the figure, message 200 may include a "Merchant Type" field 302, which indicates the merchant category of the merchant. Types of merchant categories include, for example: restaurant; clothing retailer; government agency; hotel; and the like. Message 200 also may include a "Primary Account Number" field 304, which indicates the merchant's account number to be used with the transaction. For example, the merchant may be one of a chain of establishments (e.g., The Gap®) that each share a common account number. A "Currency Code, Transaction" field 306 may be included in message 200 to indicate the type of currency (e.g., euro, U.S. dollar, yen, or the like) of the transaction. A person of skill in the relevant art(s) will appreciate that the number and types of fields in message 200 are not limited to those shown in FIG. 3 and/or discussed above, and may include any number and type(s) of field(s).

III. Process

Figure 4:
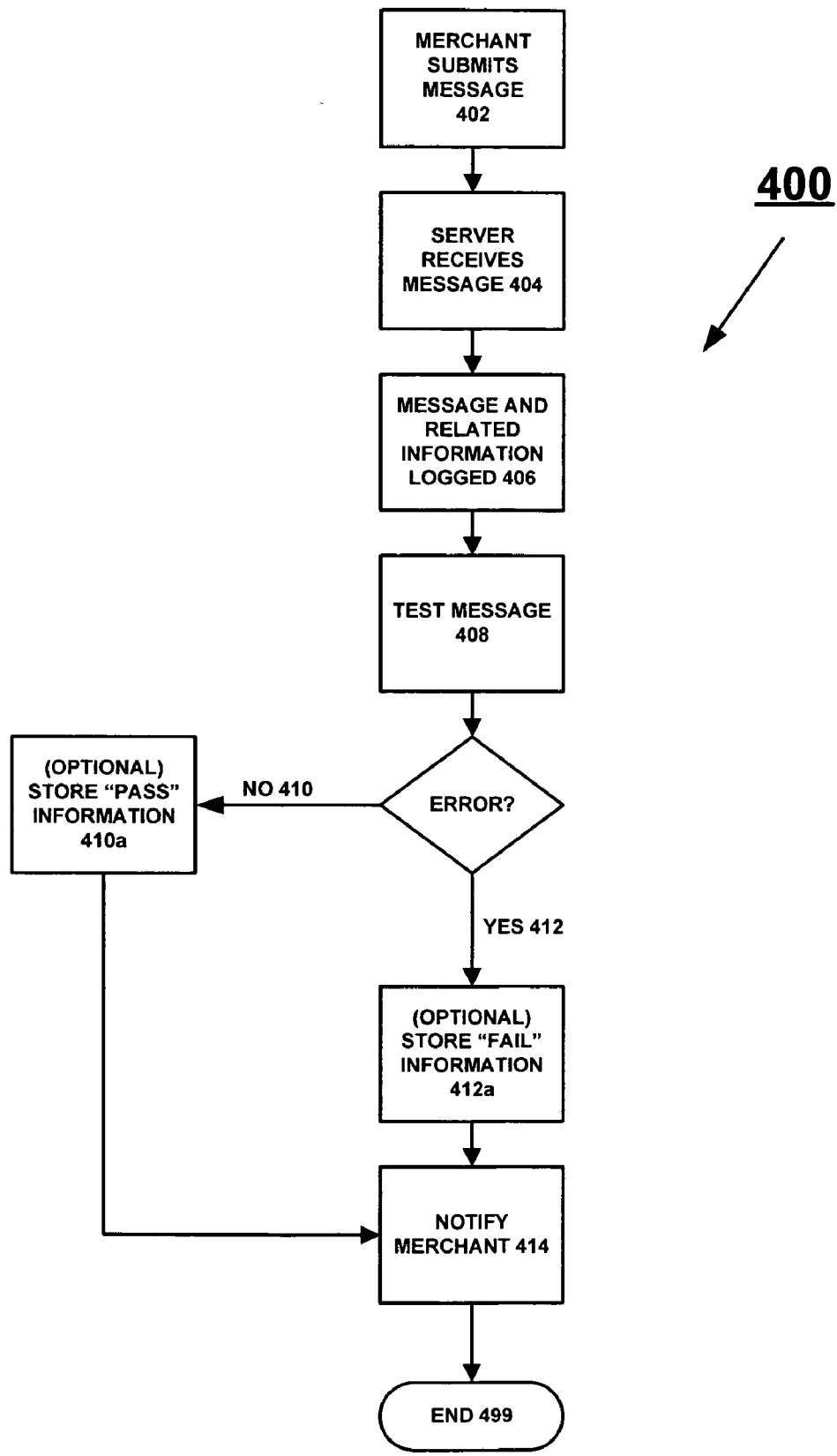
FIG. 4 shows a flowchart illustrating a message-testing process, according to an embodiment of the present invention.

Referring to FIG. 4, a flowchart illustrating a message-testing process 400, according to an embodiment of the present invention, is shown. Preferably, process 400 utilizes GAN system 100. As discussed above, optional security measures (e.g., firewall, SSO, etc.) may be implemented prior to and/or concurrently with communication with server 102.

Process 400 begins at step 402, at which a merchant electronically submits a message to be tested from merchant computing system 104 to server 102 of GAN system 100 via communication network 106. The message may be transmitted according to TCP/IP standards, including TCP/IP over Frame Relay; according to X.25 standards; by a dial-up technique; by accessing a site on the Internet via a URL; or by any other electronic transfer means.

At step 404, server 102 receives the message and, at step 406, the message as well as information regarding the message is logged in database 108 by server 102. Preferably, as discussed above, the message is an alphanumeric string formatted according to a known standard, such as the ISO-8583 standard.

At step 408, server 102 executes a software program that tests the alphanumeric string for errors, which may include syntax errors, data errors, format errors, and the like. For example, in "Merchant Type" field 302 shown in FIG. 3, if message 200 included a value of "5611" (the latter two symbols being lowercase alphabetic symbols) instead of a value of "5611" (all the symbols being numeric symbols) then the program would determine that an error is present in this field because of the existence of non-numeric symbols. In "Date Local (YYMMDD)" field 308 shown in FIG. 3, if message 200 included a value of "071305" or a value of "71305" then the program would determine that an error is present in this field because there is no month (MM) corresponding to "13" in the first value and because there are not enough digits in the second value. Another type of error is when a necessary information field is omitted, in which case the program would determine that message 200 is incomplete.

The above-listed errors are exemplary of the many types of errors that may be included in a message, and a person of skill in the relevant art(s) will appreciate that the present invention is not limited to the exemplary errors, which are provided purely for illustrative purposes.

Preferably the software program is constructed with an object-oriented programming language such as Java™, although the use of other programming languages is within the realm of one skilled in the relevant art(s). The program reads header information from the alphanumeric string and uses the header information to determine the fields represented by the string and the characters corresponding to the fields. The characters of the fields are tested by subroutines of the program to check for errors. The subroutines are coded with pre-defined validation rules on the types and the types and arrangement of characters permissible for the respective fields. That is, each field is tested by a subroutine that is specifically coded to detect errors in that field. Detected errors, if any, are noted for all of the fields, so that comprehensive error reports may be provided to the merchants. As will be appreciated by those skilled in the relevant art(s), the subroutines may be executed sequentially or in parallel using known hardware and/or software arrangements.

According to an optional aspect of the embodiment, the software program is a modular program that includes routines or modules that function to test the characters of the fields represented by the alphanumeric string. That is, each field is tested by a module that is specifically coded to detect errors in that field. In this way, selected modules of the program may be "taken down" for modification while other portions of the program remain functional.

At step 410, if no errors are detected in the tested message, process 400 proceeds to step 414. At step 410a, which is an optional step, a "pass" record of the successful testing is stored in database 108 together with the message submitted for testing.

At step 412, if one or more errors are detected in the message, a "fail" record is made identifying each information field where an error is found and the type of error found (e.g., too many or too few symbols; improper use of alphabetic or numeric symbols; unrecognizable symbol(s); incomplete message; unrecognizable field; unrecognizable field value, etc.). At step 412a, which is an optional step, the "fail" record is stored in database 108 together with the message submitted for testing.

At step 414, the merchant is automatically notified of the test results. According to an aspect of the embodiment, server 102 executes a notification routine, which causes the server 102 to send an electronic notification message (e.g., an e-mail message) to merchant computing system 104 from which the message was submitted for testing.

Optionally, the notification process may be sent as an authorization message to the merchant's POS device, which is identified based on contents of the message submitted for testing. The authorization message includes a pre-defined response code known by the merchant to indicate, for example, that the message submitted for testing has been found to be free of errors. This feature allows the merchant to test the ability of the POS device to accept standard responses or messages from a card-authorization system. That is, sending the notification message to the merchant's POS device enables the merchant to find out that the tested message is satisfactory and also, at the same time, subjects the POS device to a reception exercise to see how well the POS device receives messages.

If no errors were detected in the message during testing, the notification message indicates that the tested message is acceptable for use by the merchant's POS device, and that the merchant should submit the tested message for final certification in order to begin using the message. Process 400 then ends at step 499. This allows the merchant to test a message without having to commit to using the tested message should the tested message be determined to be error-free, thus enabling the merchant to choose from among a plurality of error-free messages that have been tested by GAN system 100. Only a tested, error-free message that has received a final certification may be used with the merchant's POS device.

If one or more errors are detected in the message during testing, the notification message indicates that the tested message is unacceptable for use in its present state, and also provides a listing of the field(s) where the error(s) was/were found, and the type(s) of error(s) found. This allows the merchant easily to make corrections to the message and resubmit the message for testing.

Preferably, a copy of the tested message is attached to the notification message. This avoids confusion in situations in which the merchant submits more than one message for testing.

Optionally, if it is determined, based on the identity of the merchant, that the merchant prefers to receive notification messages by facsimile, by e-mail to a designated e-mail address, by a posting on a Web site, or by other notification means in addition to or instead of through merchant computing system 104, the notification routine causes server 102 to forward the notification message for delivery by the merchant's preferred notification means.

IV. Example Implementation(s)

The present invention (i.e., GAN system 100, message-testing process 400 or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 5:
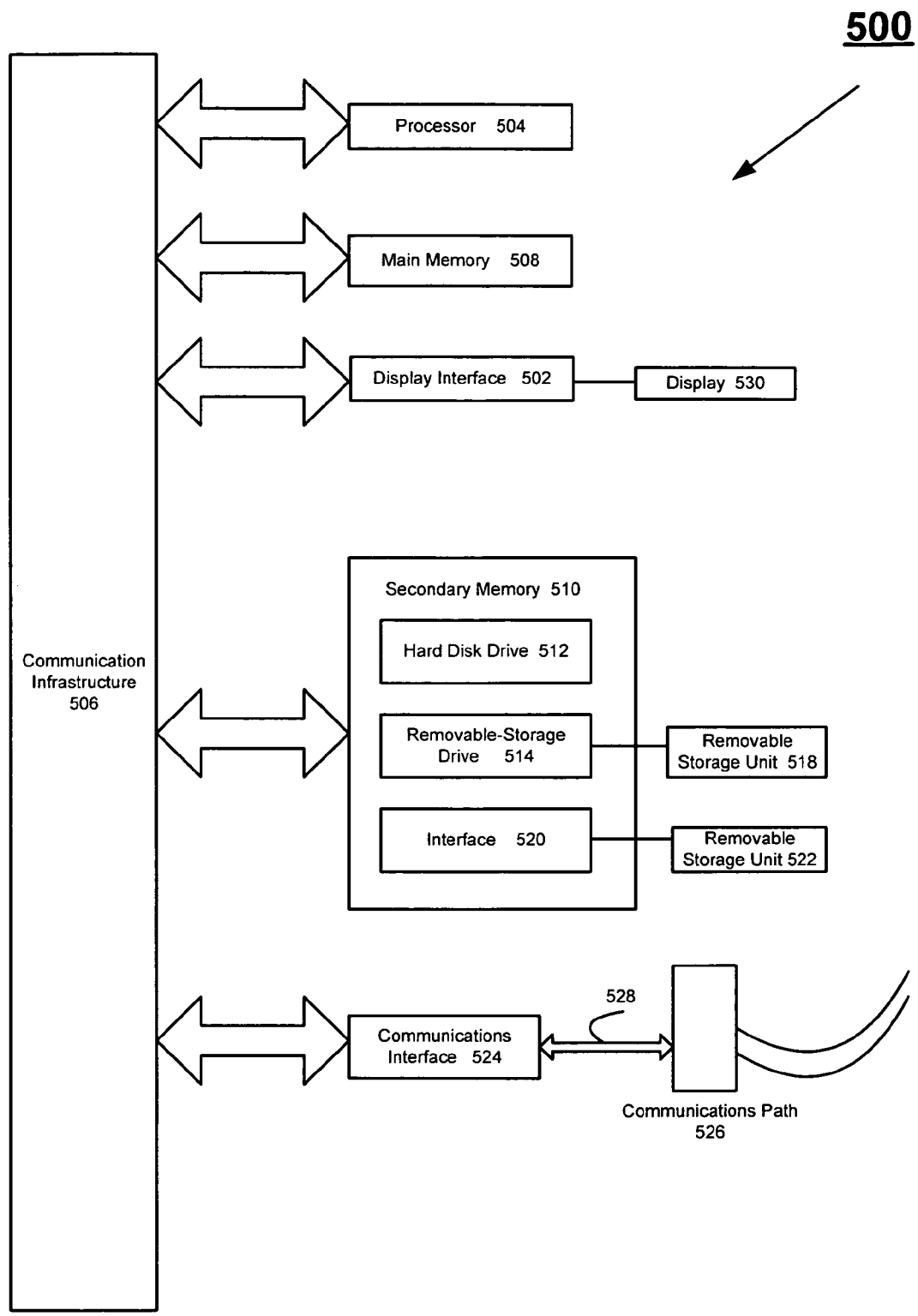
FIG. 5 shows a block diagram of an exemplary computer system useful for implementing the present invention.

In fact, in one embodiment, the present invention is directed toward one or more computer systems equipped to carry out the functions described herein. An example of such a computer system 500 is shown in FIG. 5.

Computer system 500 includes at least one processor 504. Processor 504 is connected to a communication infrastructure 506 (e.g., a communications bus, a cross-over bar device, or a network). Although various software embodiments are described herein in terms of this exemplary computer system 500, after reading this description, it will become apparent to a person skilled in the relevant art(s) how to implement the invention using other computer systems and/or architectures. 10051J Computer system 500 includes a display interface 502 that forwards graphics, text, and other data from communication infrastructure 506 (or from a frame buffer (not shown)) for display on a display unit 530.

Computer system 500 also includes a main memory 508, which preferably is a random access memory (RAM), and may also include a secondary memory 510. Secondary memory 510 may include, for example, a hard disk drive 512 and/or a removable-storage drive 514 (e.g., a floppy disk drive, a magnetic tape drive, an optical disk drive, and the like). Removable-storage drive 514 reads from and/or writes to a removable storage unit 518 in a well-known manner. Removable storage unit 518 may be, for example, a floppy disk, a magnetic tape, an optical disk, and the like, which is written to and read by removable-storage drive 514. As will be appreciated, removable storage unit 518 includes a computer-usable storage medium having stored therein computer software and/or data.

In alternative embodiments, secondary memory 510 may include other similar devices for allowing computer programs or other instructions to be loaded into computer system 500. Such devices may include a removable storage unit 522 and an interface 520 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 522 and interfaces 520 that allow software and data to be transferred from removable storage unit 522 to computer system 500.

Computer system 500 may also include a communications interface 524, which allows software and data to be transferred between computer system 500 and external devices (not shown). Examples of communications interface 524 may include a modem, a network interface (e.g., an Ethernet card), a communications port, a Personal Computer Memory Card International Association ("PCMCIA") interface, and the like. Software and data transferred via communications interface 524 are in the form of signals 528, which may be electronic, electromagnetic, optical or another type of signal that is capable of being received by communications interface 524. Signals 528 are provided to communications interface 524 via a communications path 526 (e.g., a channel). Communications path 526 carries signals 528 and may be implemented using wire or cable, fiber optics, a telephone line, a cellular link, a radio-frequency ("RF") link, or the like.

As used herein, the phrases "computer program medium" and "computer usable medium" may be used to generally refer to removable storage unit 518 used with removable-storage drive 514, a hard disk installed in hard disk drive 512, or and signals 528, for example. These computer program products provide software to computer system 500. The present invention may be implemented or embodied as one or more of such computer program products.

Computer programs (also referred to as computer control logic) are stored in main memory 508 and/or secondary memory 510. The computer programs may also be received via communications interface 524. Such computer programs, when executed, enable computer system 500 to perform the features of the present invention, as discussed herein. In particular, the computer programs, when executed, enable processor 504 to perform the features of the present invention. Accordingly, such computer programs represent controllers of computer system 500.

In an embodiment where the present invention is implemented using software, the software may be stored in a computer program product and loaded into computer system 500 using removable-storage drive 514, hard drive 512, or communications interface 524. The control logic (software), when executed by processor 504, causes processor 504 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

V. Conclusion

The various embodiments of the present invention described above have been presented by way of example and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A computer-readable medium having stored thereon sequences of instructions, the sequences of instructions including instructions, which, when executed by a computer system, cause the computer system to perform:

receiving, from a merchant point of sale (POS) system via a network, a message to be evaluated, wherein the message is a test message not associated with an actual financial transaction request;

reading header information in the message;

determining, based at least in part on the header information, a plurality of fields represented in the message;

evaluating the plurality of fields using a plurality of subroutines, wherein each one of the plurality of subroutines is distinct from each other one of the plurality of subroutines and is associated with one of the plurality of fields, respectively, wherein each of the plurality of subroutines is coded with a plurality of pre-defined validation rules defining types of characters and an arrangement of characters permissible for one of the plurality of fields, respectively, and wherein each of the plurality of subroutines is modular, allowing at least one distinct one of the plurality of subroutines to be edited while another distinct one of the plurality of subroutines evaluates one of the plurality of fields;

sending an evaluation-result notification after the evaluating is complete, wherein, when the evaluating detects no error in the message, the evaluation-result notification reports that the message is error-free and that, upon certifying the message, the merchant POS system may use the message for completing one or more financial transaction requests;

receiving, from the merchant POS system, after the evaluating detects no error in the message, a request for certification of the message;

certifying the message, wherein the certifying is required in order for the merchant POS system to use the message for completing the one or more financial transaction requests;

receiving, from the merchant POS system after the certifying, a financial transaction request using the message; and processing the financial transaction request.

2. A computer-readable medium according to claim 1, wherein, when the evaluating of the message detects at least one error in the message, the evaluation-result notification identifies each detected error.

3. A computer-readable medium according to claim 1, wherein, when the evaluating detects no error in the message, the evaluation-result notification is sent to a POS device.

4. A computer-readable medium according to claim 1, wherein the sequences of instructions further comprise instructions, which, when executed by a computer system, cause the computer system to perform:

storing the message and a result of the evaluating in a storage unit.

5. A computer-readable medium according to claim 1, wherein the message conforms with an International Organization for Standardization standard.

6. A computer-readable medium according to claim 1, wherein the message is received as a TCP/IP transmission.

7. An apparatus comprising a processor and a memory storing a program executable by the processor, wherein the program includes computer code for implementing a method for error-testing a message received from a merchant point of sale (POS) system via a communication network, the method including steps of:

receiving, from the merchant POS system via the network, a message to be evaluated, wherein the message is a test message not associated with an actual financial transaction request;

reading header information in the message;

determining, based at least in part on the header information, a plurality of fields represented in the message;

evaluating the plurality of fields using a plurality of subroutines, wherein each one of the plurality of subroutines is distinct from each other one of the plurality of subroutines and is associated with one of the plurality of fields, respectively, wherein each of the plurality of subroutines is coded with a plurality of pre-defined validation rules defining types of characters and an arrangement of characters permissible for one of the plurality of fields, respectively, and wherein each of the plurality of subroutines is modular, allowing at least one distinct one of the plurality of subroutines to be edited while another distinct one of the plurality of subroutines evaluates one of the plurality of fields;

sending an evaluation-result notification after the evaluating is complete, wherein, when the evaluating detects no error in the message, the evaluation-result notification reports that the message is error-free and that, upon certifying the message, the merchant POS system may use the message for completing one or more financial transaction requests;

receiving, from the merchant POS system after the evaluating detects no error in the message, a request for certification of the message;

certifying the message, wherein the certifying is required in order for the merchant POS system to use the message for completing the one or more financial transaction requests;

receiving, from the merchant POS system, after the certifying, a financial transaction request using the message; and processing the financial transaction request.

8. An apparatus according to claim 7, wherein, when the evaluating of the message detects at least one error in the message, the evaluation-result notification identifies each detected error.

9. An apparatus according to claim 7, wherein, when the evaluating detects no error in the message, the evaluation-result notification is sent to a POS device.

10. An apparatus according to claim 7, wherein the method further includes a step of:

storing the message and a result of the evaluating in a storage unit.

11. An apparatus according to claim 7, wherein the message conforms with an International Organization for Standardization standard.

12. An apparatus according to claim 7, wherein the message is received as a TCP/IP transmission.

13. A system for error-testing a message received from a merchant point of sale (POS) system via a communication network, in which the message is to be used in connection with a transaction involving a financial transaction instrument, the system comprising:

a first communication module, which functions to receive, from the merchant POS system via the network, a message to be evaluated, wherein the message is a test message not associated with an actual financial transaction request;

a reading module, which reads header information in the message and determines, based at least in part on the header information, a plurality of fields represented in the message;

a storage unit in which a plurality of subroutines are stored,
wherein each one of the plurality of subroutines is distinct from each other one of the plurality of subroutines and is associated with one of the plurality of fields, respectively, wherein each of the plurality of subroutines is coded with a plurality of pre-defined validation rules defining types of characters and an arrangement of characters permissible for one of the plurality of fields, respectively, and wherein each of the plurality of subroutines is modular, allowing at least one distinct one of the plurality of subroutines to be edited while another distinct one of the plurality of subroutines evaluates one of the plurality of fields;

an evaluation module, which performs an evaluation of the plurality of fields using the plurality of subroutines;

a second communication module, which functions to send an evaluation-result notification after the evaluating is complete, wherein, when the evaluating detects no error in the message, the evaluation-result notification reports that the message is error-free and that, upon certifying the message, the merchant POS system may use the message for completing one or more financial transaction requests;

a third communication module, which receives, from the merchant POS system after the evaluating detects no error in the message, a request for certification of the message;

a certifying module, which certifies the message, wherein certifying the message is required in order for the merchant POS system to use the message for completing the one or more financial transaction requests;

a fourth communication module, which receives, from the merchant POS system, after the message has been certified, a financial transaction request using the message;

a processing module which processes the financial transaction request; and a processor, which functions to control operation of the reading module, the storage unit, the first, second, third, and fourth communication modules, the evaluation module, the certifying module, and the processing module.

14. A system according to claim 13, wherein the reading module, the first communication module, the second communication module, the third communication module, the fourth communication module, the evaluation module, the certifying module, and the processing module are software modules executed by the processor.

* * * * *

UNITED STATES PATENT AND TRADEMARK OFFICE
CERTIFICATE OF CORRECTION

PATENT NO. : 7,613,632 B2
APPLICATION NO. : 11/273002
DATED : November 3, 2009
INVENTOR(S) : Chiappetti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 559 days.

Signed and Sealed this

Nineteenth Day of October, 2010

David J. Kappos
*Director of the United States Patent and Trademark Office*